United States Patent [19]
Dale, Jr.

[11] Patent Number: 5,531,030
[45] Date of Patent: Jul. 2, 1996

[54] SELF-CALIBRATING WHEEL ALIGNMENT APPARATUS AND METHOD

[75] Inventor: James L. Dale, Jr., Conway, Ark.

[73] Assignee: FMC Corporation, Chicago, Ill.

[21] Appl. No.: 122,854

[22] Filed: Sep. 17, 1993

[51] Int. Cl.⁶ .......................... G01C 25/00; G01B 11/275
[52] U.S. Cl. .............. 33/203; 33/203.18; 33/288; 73/1 E
[58] Field of Search ............... 33/203, 203.18, 33/203.19, 288; 73/1 E

[56] References Cited

U.S. PATENT DOCUMENTS

| | | | |
|---|---|---|---|
| 4,204,333 | 5/1980 | Van Blerk | 33/288 |
| 4,336,658 | 6/1982 | January et al. | 33/288 |
| 4,424,700 | 1/1984 | Erickson et al. | 33/203 X |
| 4,442,696 | 4/1984 | Erikson et al. | 33/203 X |

*Primary Examiner*—Christopher W. Fulton
*Attorney, Agent, or Firm*—Henry C. Query, Jr.

[57] ABSTRACT

An apparatus and method for monitoring and automatically calibrating the primary sensors of a vehicle wheel aligner comprises secondary sensors for signaling the control means of the wheel aligner when the wheels are in known angular orientations. The outputs from the primary angle determining sensors of the wheel aligner are recorded when the secondary sensors signal the control means, and the control means calculates a calibration relationship between the outputs and the known angles to apply to future outputs of the primary sensors.

13 Claims, 2 Drawing Sheets

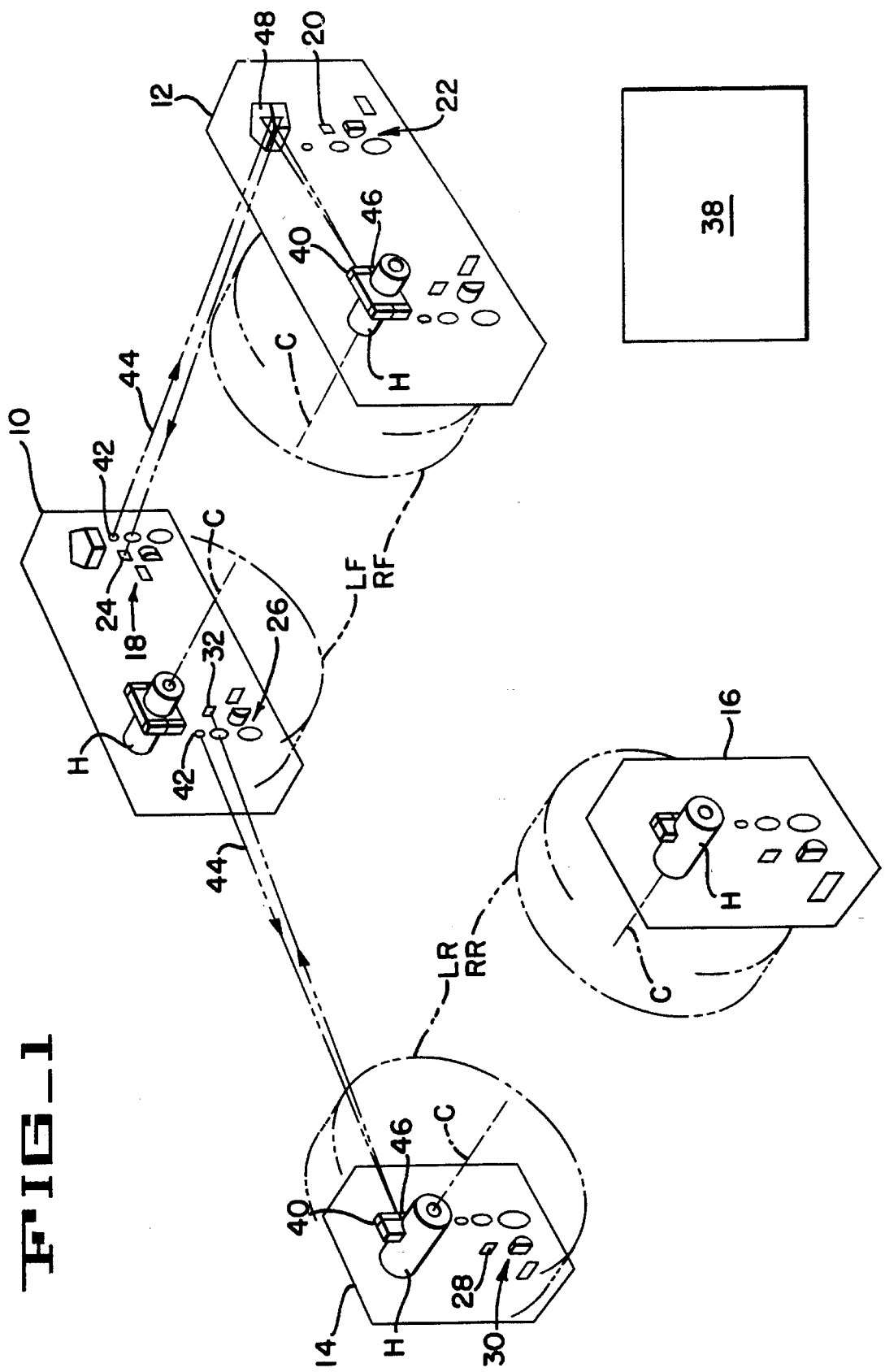
FIG_1

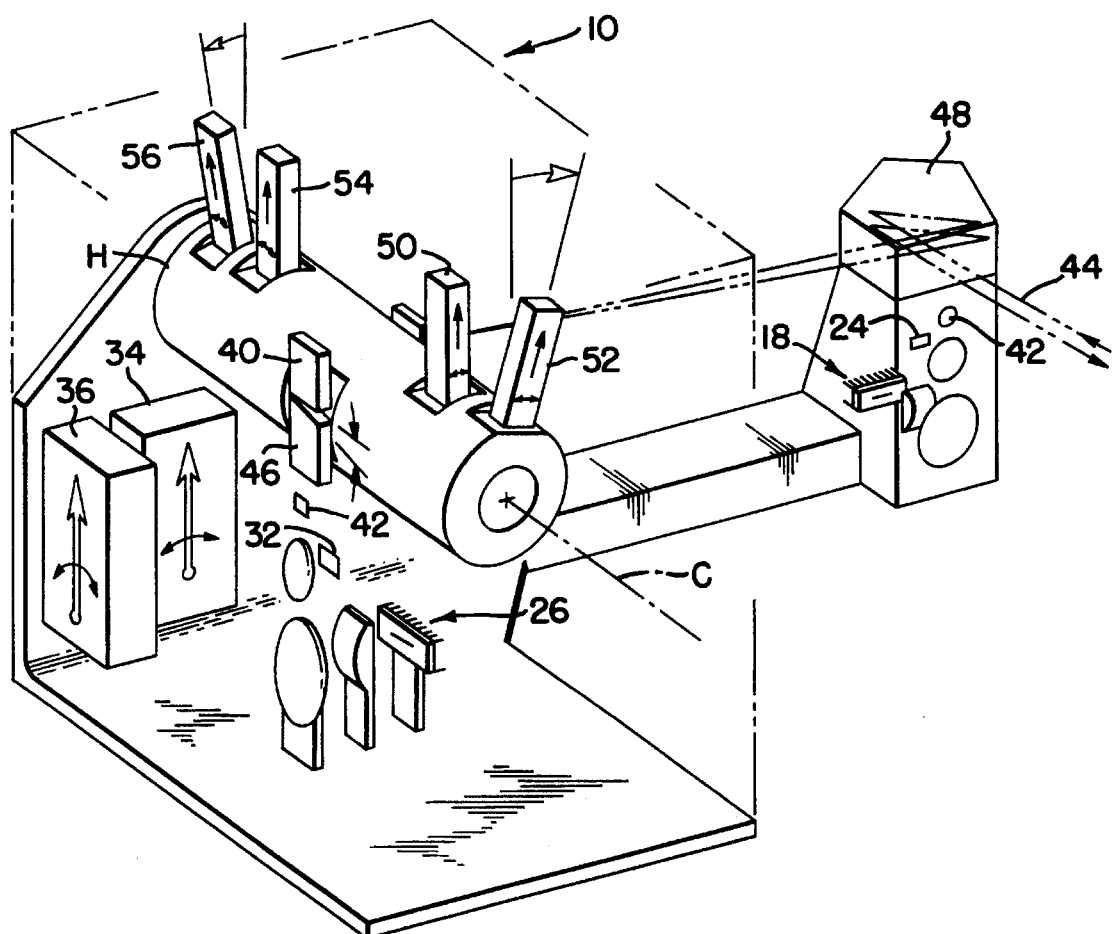
FIG_2
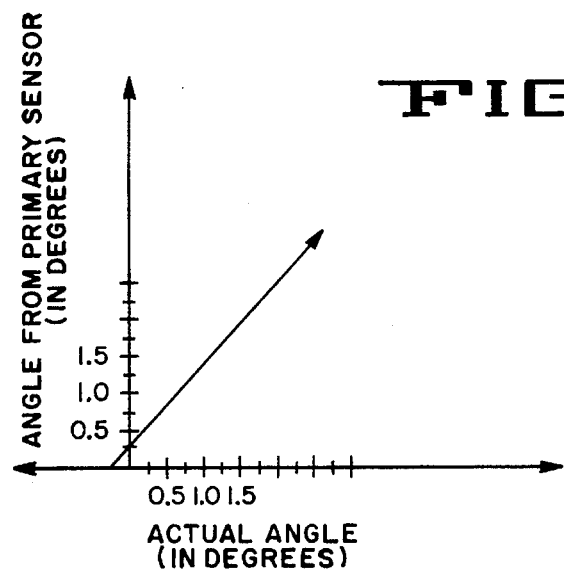
FIG_3

SELF-CALIBRATING WHEEL ALIGNMENT APPARATUS AND METHOD

BACKGROUND OF THE INVENTION

1. Field of the Invention

The present invention relates to a vehicle wheel aligner which comprises sensors that are mountable to the wheels of a vehicle and generate signals representative of the orientations of the wheels. More particularly, the invention relates to an apparatus and method for automatically calibrating the sensors during the normal operation of the wheel aligner.

2. Description of Related Art

Vehicle wheel aligners are well known in the art. Such aligners typically comprise four alignment heads which are mountable on the vehicle wheels and include sensors for generating signals representative of the angular orientations of the wheels. Typically, separate sensors are provided for measuring the angles of each wheel in the toe, camber, and caster planes. Angles in the toe plane are commonly measured using either electromechanical string-type angle measuring instruments, such as is disclosed in U.S. Pat. No. 4,341,021 issued to Beissbarth, or opto-electrical angle measuring instruments, such as is disclosed in U.S. Pat. No. 4,761,749 issued to Titsworth et al. Angles in the camber and caster planes may be measured using inclinometers, which are known to those in the art.

One problem with vehicle wheel aligners is that, during the course of their usage, the sensors may become out of calibration. Unless the sensors are calibrated regularly, the out-of-calibration condition can exist for some time, thereby causing improper wheel alignment settings. However, alignment technicians are often not comfortable performing the calibration process, and the process itself takes away from the productive use of the wheel aligner.

SUMMARY OF THE INVENTION

According to the present invention, an apparatus and method are provided for detecting when the primary sensors of a vehicle wheel aligner are out of calibration and for automatically calibrating the primary sensors during normal operation, without requiring a separate calibration procedure. In one embodiment of the invention, secondary sensors are provided in the alignment heads for generating signals when the wheels are in a first known angular orientation. To monitor the zero-set calibration of the primary sensors, the programmable control means of the wheel aligner records the outputs from the primary sensors at the known angle and compares them to the known angle. If the outputs are not within certain tolerances of the angle, then the primary sensor is out of calibration and the wheel aligner will prompt the technician to calibrate the primary sensors using conventional calibration techniques. To automatically correct the primary sensors for zero-set calibration, the control means applies the difference between the outputs from the primary sensors and the known angle to future outputs from the primary sensors. In a further embodiment, the secondary sensors also generate signals when the wheels are in a second known angular orientation. To monitor the span calibration of the primary sensors, the control means compares the difference between the outputs from the primary sensors at the two known angles with the difference between the two known angles. If the difference between outputs is greater or less than the difference between the known angles, then the wheel aligner will prompt the technician to calibrate the primary sensors. To automatically correct the primary sensors for span calibration, the control means computes a calibration relationship between the two known angles and the outputs from the primary sensors at these two known angles. The control means then applies this relationship to future outputs from the primary sensors.

These and other objects and advantages of the present invention will be made apparent from the following detailed description, with reference to the accompanying drawings.

BRIEF DESCRIPTION OF THE DRAWINGS

FIG. 1 is a perspective representation of the alignment heads of a vehicle wheel aligner comprising the calibration apparatus of the present invention;

FIG. 2 is an enlarged perspective view of one of the alignment heads depicted in FIG. 1; and FIG. 3 is a graph depicting a possible calibration relationship between the angles determined by the primary sensors of a vehicle wheel aligner and the angles determined by the secondary sensors of the present invention.

DETAILED DESCRIPTION OF THE PREFERRED EMBODIMENTS

Referring to FIG. 1, the apparatus of the present invention is shown incorporated into the alignment heads of a vehicle wheel aligner. Typical wheel aligners with which the apparatus and method of the present invention are useful are disclosed in U.S. Pat. No. 4,761,749, issued to Titsworth et al.; U.S. Pat. No. 5,208,646, issued to Rogers et al.; and U.S. Pat. No. 5,220,399, issued to Christian et al., all of which are assigned to the assignee herein. The wheel aligner depicted in FIG. 1 comprises four alignment heads 10, 12, 14 and 16 which are connected to the respective front wheels LF and RF and rear wheels LR and RR of a vehicle (not shown). As described more fully in the aforementioned Titsworth et al. patent, each alignment head comprises a hub H through which the head is rotationally supported from the shaft of a mounting fixture (not shown). Furthermore, the centerline C of each hub H is aligned with the axis of rotation of the corresponding wheel using well known run-out compensation techniques so that the plane of the wheel will appear to be perpendicular to centerline C.

The alignment heads comprise sensors for generating signals representative of the orientation of the wheels in three alignment planes: the caster plane, which is the vertical plane perpendicular to the axis of rotation of the wheel, the camber plane, which is the vertical plane perpendicular to the caster plane, and the toe plane, which is the horizontal plane perpendicular to both the caster and camber planes. These sensors, referred to herein as the primary sensors, can be any of a number of different types of angle measuring instruments. For example, in the embodiment of the vehicle wheel aligner depicted in FIG. 1, the primary toe angle sensors are opto-electrical angle measuring instruments of the type described in the aforementioned Titsworth et al. patent. According to this embodiment, a cross toe sensor comprises an optical emitter 18 located in head 10 and a corresponding detector 20 located in head 12. An additional cross toe sensor comprises an optical emitter 22 located in head 12 and a detector 24 located in head 10. The light beam emanating from emitter 18 and detected by detector 20 provides an indication of the angle of the plane of wheel LF with respect to a reference line extending between heads 10 and 12. Similarly, the light beam emanating from emitter 22 and detected by detector 24 provides an indication of the angle of the plane of wheel RF with respect to the reference line. A track toe sensor comprises an optical emitter 26 located in head 10 and a detector 28 located in head 14. An additional track toe sensor comprises an optical emitter 30 located in head 14 and a detector 32 located in head 10. The light beam emanating from emitter 26 and detected by detector 28 provides an indication of the angle of the plane of wheel LF with respect to a reference line extending between heads 10 and 14. Similarly, the light beam emanating from emitter 30 and detected by detector 32 provides an indication of the angle of the plane of wheel LR with respect to the reference line. Similar track toe sensors in heads 12 and 16 provide information relating to the angles of the planes of wheels RF and RR. The apparatus and method of the present invention may also be used with other types of toe angle measuring instruments, such as the electromechanical sensor disclosed in the aforementioned Beissbarth patent, or a CCD camera sensor of the type disclosed in U.S. Pat. No. 5,056,233, issued to Hechel et al.

Referring to FIG. 2, each alignment head may comprise an inclinometer 34 for measuring the angles in the caster plane of the corresponding wheel on which the head is mounted. Similarly, an inclinometer 36 may be used for measuring the angles in the camber plane of the wheel. However, the apparatus and method of the present invention may be used with other types of sensors for measuring the angles in the caster and camber planes.

The signals generated by the sensors are communicated to a console 38, which includes programmable control means for controlling the operation of the aligner, processing the signals and generating data relating to the angular orientation of each wheel in each alignment plane. The control means is preferably a central processing unit comprising a microprocessor. Console 38 may also include display means for displaying the data.

According to the present invention, the calibration of each of the primary sensors is monitored and corrected by secondary sensors mounted in each of the alignment heads. The secondary sensors are referenced to the centerline C of hub H of the corresponding alignment head and function to generate signals when the planes of the wheels, and consequently the alignment heads, are in known angular orientations. The outputs from the primary sensors at these known angles are used to monitor and automatically correct the zero set and span calibration of the primary sensors.

For simplicity sake, an example of a secondary toe angle sensor will be described with reference to the primary track toe sensor comprising emitter 30 in head 14 and detector 32 in head 10, it being understood that all of the secondary toe angle sensors are generally the same. To monitor the zero set calibration of the primary track toe sensor, the secondary track toe sensor comprises a narrow mirror 40, which is mounted on hub H of head 14 in vertical alignment with emitter 30 in a vertical plane generally parallel to centerline C, and a wide angle point source of light 42 located in head 10 in vertical alignment with detector 32. Light 42 emits a beam of light 44 toward head 14. Since mirror 40 is mounted in a vertical plane parallel to centerline C, beam 44 will be reflected off of mirror 40 and back to detector 32 only when the angle between the plane of rotation of wheel LR and the reference line extending between heads 10 and 14 is zero degrees. Thus, if the primary track toe sensor is in zero-set calibration, the output from the primary track toe sensor should be zero degrees when detector 32 detects beam 44. If the output from the primary track toe sensor is different from zero by a certain predetermined tolerance, then the control means will prompt the service technician to calibrate the primary track toe sensor.

According to a further embodiment of the invention, to automatically correct the primary track toe sensor for zero-set calibration, the control means will record as a calibration factor the output from the primary track toe sensor when detector 32 detects beam 44 and apply the calibration factor to future angles determined by the primary track toe sensor.

In a further embodiment of the invention, to monitor the span calibration of the primary track toe sensor comprising emitter 30, the secondary track toe sensor comprises a second mirror 46 mounted on hub H at a known angle to mirror 40 and, consequently, to centerline C (see, e.g., FIG. 2). This known angle could be, for example, one degree. Thus, beam 44 will be reflected off of mirror 46 and be detected by detector 32 when the angle between the plane of rotation of wheel LR and the reference line extending between heads 10 and 14 is the known angle. The control means will record the outputs from the primary sensor when the plane of wheel LR is at zero degrees and the known angle and compare the difference between these outputs to the known angle (i.e., the difference between the known angle and zero degrees). If the difference is greater or less than the known angle by a certain predetermined tolerance, then the control means will prompt the technician to calibrate the primary track toe sensor.

In another embodiment of the invention, to automatically correct the primary sensors for span calibration, the control means computes a calibration relationship between the two known angles and the outputs from the primary track toe sensor at the two known angles and applies the calibration relationship to future outputs from the primary track toe sensor. An example of such a relationship is shown graphically in FIG. 3.

In order for detector 28 to recognize which beam it is receiving, the aligner control means time multiplexes emitter 30 and light 42 so that they are not active at the same time. In addition, statistical methods may be used to average the calibration factors to reduce the effects of minor errors in individual calibrations. The secondary sensor also comprises means for shuttering between mirrors 40 and 46. The shuttering means is controlled by the control means and is time multiplexed with light 42 so that the control means can determine which fixed angle the secondary sensor is measuring. The shuttering means can be either a mechanical shutter, which operates to expose only one mirror at a time, or an electronic liquid crystal display positioned over each mirror to black out each mirror at the appropriate times.

The secondary sensors for the primary cross toe sensors, for example the primary cross toe sensor comprising emitter 22 in head 12 and detector 24 in head 10, comprise a ninety degree reflecting prism 48, which in this example is mounted in head 12. Light beam 44 emanating from light 42 in the secondary cross toe sensor is bent ninety degrees so that it can be reflected off of mirrors 40 and 46 mounted on hub H of head 12. Thus, detector 24 in head 10 will detect beam 44 being reflected off of mirror 40 when the plane of wheel RF is ninety degrees with respect to the reference line connecting heads 10 and 12. Similarly, detector 24 will detect beam 44 being reflected off of mirror 46 when the plane of wheel RF is at a known angle from ninety degrees with respect to the reference line connecting heads 10 and 12. In the manner described above with reference to the track toe sensors, the control means uses the outputs from the primary cross toe sensors at these two angles to monitor and automatically correct the primary cross toe sensors for zero-set and span calibration.

The secondary sensors for calibrating the caster and camber inclinometers are preferably precision level measuring means, such as fluid vial-type devices which are accurate over small angular spans. However, inclinometers similar to the primary sensors could also be used as the secondary sensors. Referring to FIG. 2, to monitor the zero-set calibration of the primary caster inclinometer 34, the secondary caster sensor comprises a first measuring means 50 mounted vertically on hub H in the caster plane. When the orientation of the wheel is at zero degrees in the caster plane, measuring means 50 will signal the control means. If the output from inclinometer 34 is different from zero by a predetermined tolerance, the control means will prompt the technician to calibrate inclinometer 34.

In a further embodiment, to automatically correct inclinometer 34 for zero-set calibration, the control means will record as a calibration factor the output from inclinometer 34 when measuring means 50 generates a signal and apply this calibration factor to future angles determined by inclinometer 34. The control means may be programmed to reduce the effects of improper calibration factors being accepted and statistical methods may be used to average the calibration factors to reduce the effects of minor errors in individual calibrations.

In another embodiment of the invention, to monitor the span calibration of the primary caster inclinometer 34, the secondary caster sensor also comprises a second measuring means 50 mounted on hub H in the caster plane at a known angle from vertical, such as one degree. When the orientation of the wheel is at the known angle, measuring means 52 will signal the control means. In a manner similar to that described with reference to the secondary toe sensors, the control means will record the outputs from primary inclinometer 34 when both measuring means 50 and 52 signal the control means and compare the difference between the outputs with the difference between the known angles. If the difference between the outputs from inclinometer 34 is greater or less than the difference between the known angles by a predetermined tolerance, then the control means will prompt the technician to calibrate inclinometer 34.

In a further embodiment, to automatically correct primary inclinometer 34 for span calibration, the control means computes a calibration relationship between the two known angles and the outputs from inclinometer 34 at the two known angles and applies the calibration relationship to future outputs from inclinometer 34.

The secondary sensors to monitor and correct the zero-set and span calibration of the camber inclinometers 36 are similar to the secondary sensors used for correcting the caster inclinometers 34. To monitor and correct the zero-set calibration of camber inclinometer 36, the secondary camber sensor comprises a first measuring means 54 mounted vertically on hub H in the camber plane. To monitor and correct the span calibration of the primary camber inclinometer 36, the secondary camber sensor also comprises a second measuring means 56, which is mounted on hub H in the camber plane at a known angle from vertical. Measuring means 54 and 56 operate in the same manner as measuring means 50 and 52, and therefore a separate discussion thereof is not necessary.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. In combination with a vehicle wheel aligner having at least one primary sensor mountable to a wheel of a vehicle for measuring the angular orientation of the wheel with respect to a reference, the improvement comprising:

first sensor means mountable to the wheel for generating a signal when the wheel is oriented at a first known angle with respect to the reference; and means responsive to the signal generated by the first sensor means for determining a difference between the angle measured by the primary sensor when the wheel is oriented at the first known angle and the first known angle and determining whether the difference is greater than a certain predetermined amount.

2. The apparatus of claim 1, further comprising:

means for applying the first difference to measurements made by the primary sensor;

whereby the first difference is used to correct the primary sensor for zero-set calibration.

3. In combination with a vehicle wheel aligner having at least one primary sensor mountable to a wheel of a vehicle for measuring the angular orientation of the wheel with respect to a reference, the improvement comprising:

first sensor means mountable to the wheel for generating a first signal when the wheel is oriented at a first known angle with respect to the reference;

second sensor means mountable to the wheel for generating a second signal when the wheel is oriented at a second known angle with respect to the reference; and means responsive to the first and second signals for comparing a first difference between the first and second known angles with a second difference between the angles measured by the primary sensor when the wheel is oriented at the first and second known angles, and for determining whether the second difference is greater or less than the first difference by a certain predetermined amount.

4. The apparatus of claim 3, further comprising:

means for determining a relationship between the first and second known angles and the angles measured by the primary sensor when the wheel is oriented at the first and second known angles and applying the relationship to subsequent outputs from the primary sensor;

whereby the relationship is used to correct the primary sensor for span calibration.

5. A method of calibrating a vehicle wheel aligner having at least one primary sensor for generating outputs indicative of the angular orientations of a wheel of a vehicle with respect to a reference, comprising the steps of:

recording a first output from the primary sensor when the wheel is oriented at a first known angle with respect to the reference;

recording a second output from the primary sensor when the wheel is oriented at a second known angle with respect to the reference;

calculating a relationship between the first and second outputs and the first and second known angles; and applying the relationship to subsequent outputs from the sensor;

whereby the subsequent outputs are corrected in accordance with the relationship.

6. In combination with a vehicle wheel aligner having at least one angle measuring instrument mountable to a first wheel of a vehicle for measuring the angle of the wheel with respect to a reference line extending between the wheel and a second, adjacent wheel, the improvement comprising:

a sensor comprising a reflective means mountable in a vertical plane at a first known angle relative to the rotational centerline the first wheel, a light emitting means mountable on the second wheel in alignment with the reference line, and a light detecting means mountable on the second wheel in vertical alignment with the light emitting means;

wherein light from the light emitting means will be reflected off of the reflective means and back to the light detecting means when the first wheel is oriented at the first known angle with respect to the reference line; and controller means in electrical communication with the angle measuring instrument and the sensor for determining a difference between the first known angle and the angle measured by the angle measuring instrument when the first wheel is oriented at the first known angle and for determining whether the difference is greater than a certain predetermined amount.

7. The apparatus of claim 6, further comprising:

means for applying the difference to measurements made by the angle measuring instrument;

whereby the difference is used to correct the angle measuring instrument for zero-set calibration.

8. In combination with a vehicle wheel aligner having at least one angle measuring instrument mountable to a first wheel of a vehicle for measuring the angle of the first wheel with respect to a reference line extending between the first wheel and a second, adjacent wheel, the improvement comprising:

a sensor comprising a first reflective means mountable in a vertical plane at a first known angle relative to the rotational centerline the first wheel, a second reflective means mountable in a vertical plane at a second known angle relative to the rotational centerline of the first wheel, a light emitting means mountable on the second wheel in alignment with the reference line, and a light detecting means mountable on the second wheel in vertical alignment with the light emitting means;

wherein light from the light emitting means will be reflected off of the first and second reflective means and back to the light detecting means when the first wheel is oriented respectively at the first and second known angles with respect to the reference line; and controller means in electrical communication with the angle measuring instrument and the sensor for comparing a first difference between the first and second known angles with a second difference between the angles measured by the angle measuring instrument when the first wheel is oriented at the first and second known angles, and for determining whether the second difference is greater or less than the first difference by a certain predetermined amount.

9. The apparatus of claim 8, further comprising:

means for determining a relationship between the first and second known angles and the angles measured by the angle measuring instrument when the first wheel is oriented at the first and second known angles and for applying the relationship to subsequent outputs from the angle measuring instrument;

whereby the relationship is used to correct the angle measuring instrument for span calibration.

10. In combination with a vehicle wheel aligner having at least one angle measuring instrument mountable to a wheel of a vehicle for measuring the angle of the wheel in a vertical reference plane oriented with respect to the rotational centerline of the wheel, the improvement comprising:

sensor means mountable relative to the rotational centerline of the wheel at a first known angle to vertical for generating a signal when the wheel is oriented at the first known angle; and controller means in electrical communication with the angle measuring instrument and the sensor means for determining a difference between the first known angle and the angle measured by the angle measuring instrument when the first wheel is oriented at the first known angle, as determined by the sensor means, and for determining whether the difference is greater than a certain predetermined amount.

11. The apparatus of claim 10, further comprising:

means for applying the difference to measurements made by the angle measuring instrument;

whereby the difference is used to correct the angle measuring instrument for zero-set calibration.

12. In combination with a vehicle wheel aligner having at least one angle measuring instrument mountable to a wheel of a vehicle for measuring the angle of the wheel in a vertical reference plane oriented with respect to the rotational centerline of the wheel, the improvement comprising:

a first sensor means for measuring the angle of the wheel in the vertical reference plane;

the first sensor means being mountable relative to the rotational centerline at a first known angle to vertical and being operable to generate a first signal when the wheel is oriented at the first known angle;

a second sensor means for measuring the angle of the wheel in the vertical reference plane;

the second sensor means being mountable relative to the rotational centerline at a second known angle to vertical and being operable to generate a second signal when the wheel is oriented at the second known angle; and controller means in electrical communication with the angle measuring instrument and the first and second sensors for comparing a first difference between the first and second known angles with a second difference between the angles measured by the angle measuring instrument when the wheel is oriented at the first and second known angles, as determined by the first and second sensors, and for determining whether the second difference is greater or less than the first difference by a certain predetermined amount.

13. The apparatus of claim 12, further comprising:

means for determining a relationship between the first and second known angles and the angles measured by the angle measuring instrument when the wheel is oriented at the first and second known angles and for applying the relationship to subsequent outputs from the angle measuring instrument;

whereby the relationship is used to correct the angle measuring instrument for span calibration.

* * * * *